US010830578B2

United States Patent
Weber et al.

(10) Patent No.: US 10,830,578 B2
(45) Date of Patent: Nov. 10, 2020

(54) HIGH-SPEED METROLOGY

(71) Applicant: Inkbit, LLC, Medford, MA (US)

(72) Inventors: Aaron Weber, Arlington, MA (US);
Kiril Vidimce, Cambridge, MA (US);
Walter H. Zengerle, III, Dedham, MA (US); Desai Chen, Arlington, MA (US);
Wojciech Matusik, Lexington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 16/656,060

(22) Filed: Oct. 17, 2019

(65) Prior Publication Data
US 2020/0124403 A1 Apr. 23, 2020

Related U.S. Application Data
(60) Provisional application No. 62/747,889, filed on Oct. 19, 2018.

(51) Int. Cl.
*G01B 9/02* (2006.01)
*G01B 11/22* (2006.01)
(Continued)

(52) U.S. Cl.
CPC ........... *G01B 11/22* (2013.01); *B29C 64/386* (2017.08); *B33Y 50/00* (2014.12); *G01B 9/02015* (2013.01)

(58) Field of Classification Search
CPC ............... G01B 11/22; G01B 9/02007; G01B 9/02008; G01B 9/02014; G01B 9/02015; G01B 9/02017; G01B 9/02019
See application file for complete search history.

(56) References Cited

U.S. PATENT DOCUMENTS 6,492,651 B2   12/2002   Kerekes
9,562,759 B2    2/2017   Vogler et al.
(Continued)

FOREIGN PATENT DOCUMENTS

EP   3459716 A1   3/2019
JP   6220476 B1  10/2017
(Continued)

OTHER PUBLICATIONS

Wieser, Wolfgang, Benjamin R. Biedermann, Thomas Klein, Christoph M. Eigenwillig, and Robert Huber. "Multi-megahertz OCT: High quality 3D imaging at 20 million A-scans and 4.5 GVoxels per second." Optics express 18, No. 14 (2010): 14685-14704.
(Continued)

*Primary Examiner* — Jonathan M Hansen
(74) *Attorney, Agent, or Firm* — Occhiuti & Rohlicek LLP

(57) ABSTRACT

A method and an apparatus are directed to characterizing a continuously moving 3D object via interferometry-based scanning. The method includes repeatedly forming several depth characterizations of the 3D object along respective scan lines of a plurality of scan lines on the surface of the 3D object. During this scanning, the 3D object is undergoing its continuous motion. The method further includes combining the determined depth characterization along the scan lines of the plurality of scan lines to form a depth map representing at least a depth of a portion associated with a location on the surface of the 3D object in the third direction on a grid of locations arranged in the first and second directions. Forming the depth characterizations includes scanning a frequency-dispersed pulsed optical signal in a first direction across the continuously moving 3D object, said 3D object moving in a second direction substantially orthogonal to the first direction. The scanned optical signal forming scan lines (Continued)

on a surface of the 3D object in a third direction substantially orthogonal to the first direction and the second direction.

30 Claims, 6 Drawing Sheets

(51) Int. Cl.
  *B29C 64/386* (2017.01)
  *B33Y 50/00* (2015.01)

(56) References Cited

U.S. PATENT DOCUMENTS

| | | | |
|---|---|---|---|
| 9,952,506 B2 | 4/2018 | Arai et al. | |
| 10,252,466 B2 | 4/2019 | Ramos et al. | |
| 10,456,984 B2 | 10/2019 | Matusik et al. | |
| 2002/0104973 A1 | 8/2002 | Kerekes | |
| 2007/0106172 A1 | 5/2007 | Abreu | |
| 2008/0124475 A1 | 5/2008 | Kritchman | |
| 2009/0073407 A1* | 3/2009 | Okita | G02B 26/125 355/53 |
| 2009/0105605 A1 | 4/2009 | Abreu | |
| 2009/0279098 A1* | 11/2009 | Ohbayashi | A61B 5/0066 356/478 |
| 2010/0158332 A1 | 6/2010 | Rico et al. | |
| 2013/0182260 A1 | 7/2013 | Bonnema et al. | |
| 2014/0249663 A1 | 9/2014 | Voillaume | |
| 2014/0300676 A1 | 10/2014 | Miller et al. | |
| 2015/0061178 A1 | 3/2015 | Siniscalchi et al. | |
| 2015/0101134 A1 | 4/2015 | Manz et al. | |
| 2015/0352792 A1 | 12/2015 | Kanada | |
| 2016/0023403 A1 | 1/2016 | Ramos et al. | |
| 2016/0157751 A1 | 6/2016 | Mahfouz | |
| 2016/0209319 A1 | 7/2016 | Adalsteinsson et al. | |
| 2016/0249836 A1 | 9/2016 | Gulati et al. | |
| 2016/0320771 A1 | 11/2016 | Huang | |
| 2017/0021455 A1* | 1/2017 | Dallarosa | B33Y 10/00 |
| 2017/0106604 A1 | 4/2017 | Dikovsky et al. | |
| 2017/0120337 A1 | 5/2017 | Kanko et al. | |
| 2017/0143494 A1 | 5/2017 | Mahfouz | |
| 2017/0217103 A1 | 8/2017 | Babaei et al. | |
| 2017/0355147 A1 | 12/2017 | Buller et al. | |
| 2018/0017501 A1 | 1/2018 | Trenholm et al. | |
| 2018/0056582 A1 | 3/2018 | Matusik et al. | |
| 2018/0071984 A1 | 3/2018 | Lee et al. | |
| 2018/0099333 A1 | 4/2018 | DehghanNiri et al. | |
| 2018/0143147 A1 | 5/2018 | Milner et al. | |
| 2018/0169953 A1 | 6/2018 | Matusik et al. | |
| 2018/0194066 A1 | 7/2018 | Ramos et al. | |
| 2018/0297113 A1 | 10/2018 | Preston et al. | |
| 2018/0311893 A1 | 11/2018 | Choi et al. | |
| 2018/0320006 A1 | 11/2018 | Lee et al. | |
| 2018/0341248 A1 | 11/2018 | Mehr et al. | |
| 2019/0271966 A1 | 9/2019 | Coffman et al. | |
| 2019/0346830 A1 | 11/2019 | de Souza Borges Ferreira et al. | |
| 2019/0353767 A1 | 11/2019 | Eberspach et al. | |
| 2020/0143006 A1 | 5/2020 | Matusik et al. | |
| 2020/0147888 A1 | 5/2020 | Ramos et al. | |

FOREIGN PATENT DOCUMENTS

| | | |
|---|---|---|
| JP | 2018103488 A | 7/2018 |
| KR | 101567281 B1 | 11/2015 |
| KR | 20180067961 A | 6/2018 |
| WO | 2003/026876 A2 | 4/2003 |
| WO | 2017066077 A1 | 4/2017 |
| WO | 2018209438 A1 | 11/2018 |
| WO | 2019070644 A2 | 4/2019 |
| WO | 2019125970 A1 | 6/2019 |

OTHER PUBLICATIONS

Huo, Tiancheng, Chengming Wang, Xiao Zhang, Tianyuan Chen, Wenchao Liao, Wenxin Zhang, Shengnan Ai, Jui-Cheng Hsieh, and Ping Xue. "Ultrahigh-speed optical coherence tomography utilizing all-optical 40 MHz swept-source." Journal of biomedical optics 20, No. 3 (2015): 030503.

Klein, Thomas, and Robert Huber. "High-speed OCT light sources and systems." Biomedical optics express 8, No. 2 (2017): 828-859.

Xu, Jingjiang, Xiaoming Wei, Luoqin Yu, Chi Zhang, Jianbing Xu, K. K. Y. Wong, and Kevin K. Tsia. "Performance of megahertz amplified optical time-stretch optical coherence tomography (AOT-OCT)." Optics express 22, No. 19 (2014): 22498-22512.

Park, Yongwoo, Tae-Jung Ahn, Jean-Claude Kieffer, and José Azaña. "Optical frequency domain reflectometry based on real-time Fourier transformation." Optics express 15, No. 8 (2007): 4597-4616.

Moon, Sucbei, and Dug Young Kim. "Ultra-high-speed optical coherence tomography with a stretched pulse supercontinuum source." Optics Express 14, No. 24 (2006): 11575-11584.

Zhou, Chao, Aneesh Alex, Janarthanan Rasakanthan, and Yutao Ma. "Space-division multiplexing optical coherence tomography." Optics express 21, No. 16 (2013): 19219-19227.

Alarousu, Erkki, Ahmed AlSaggaf, and Ghassan E. Jabbour. "Online monitoring of printed electronics by spectral-domain optical coherence tomography." Scientific reports 3 (2013): 1562.

Fischer, Björn, Christian Wolf, and Thomas Härtling. "Large field optical tomography system." In Smart Sensor Phenomena, Technology, Networks, and Systems Integration 2013, vol. 8693, p. 86930P. International Society for Optics and Photonics, 2013.

Qi, X.; Chen, G.; Li, Y.; Cheng, X.; and Li, C., "Applying Neural-Network Based Machine Learning to Additive Manufacturing: Current Applications, Challenges, and Future Perspectives", Jul. 29, 2018, Engineering 5 (2019) 721-729. (Year: 2019).

DebRoy, T.; Wei, H.L.; Zuback, J.S.; Muhkerjee, T.; Elmer, J.W.; Milewski, J.O.; Beese, A.M.; Wilson-Heid, A.; Ded, A.; and Zhang, W., "Additive manufacturing of metallic components—Process, structure and properties", Jul. 3, 2017, Progress in Materials Science 92 (2018) 112-224. (Year: 2017).

Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL ISSN: 0143-8166, DOI: 10.1016/j.optlaseng.2014.02.008.

Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb. 2, 2015), p. 35701, XP020281675, ISSN: 0957-0233, DOI: 10.1088/0957-0233/26/3/035701 [retrieved on Feb. 2, 2015].

Blanken, Lennart, Robin de Rozario, Jurgen van Zundert, Sjirk Koekebakker, Maarten Steinbuch, and Tom Oomen. "Advanced feedforward and learning control for mechatronic systems." In Proc. 3rd DSPE Conf. Prec. Mech, pp. 79-86. 2016.

Blanken, Lennart. "Learning and repetitive control for complex systems: with application to large format printers." (2019).

Oomen, Tom. "Advanced motion control for next-generation precision mechatronics: Challenges for control, identification, and learning." In IEEJ International Workshop on Sensing, Actuation, Motion Control, and Optimization (SAMCON), pp. 1-12. 2017.

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.

Kulik, Eduard A., and Patrick Calahan. "Laser profilometry of polymeric materials." Cells and Materials 7, No. 2 (1997): 3.

\* cited by examiner

HIGH-SPEED METROLOGY

CROSS-REFERENCES TO RELATED APPLICATIONS

This application claims the benefit of U.S. Provisional Application No. 62/747,889, filed on Oct. 19, 2018, which is incorporated herein by reference.

STATEMENT AS TO FEDERALLY SPONSORED RESEARCH

This invention was made with Government support under Agreement No. HR00111790014, awarded by DARPA. The Government has certain rights in the invention.

BACKGROUND

This invention relates to high-speed metrology, and more particularly to high-speed measurement of surface or body characteristics of a moving object during three-dimensional fabrication.

Additive manufacturing is a set of methods that allows three-dimensional objects to be fabricated via selective addition of material. A typical additive manufacturing process works by slicing a digital model (for example, represented using an STL file) into a series of layers. Then the layers are sent to a fabrication apparatus that deposits the layers one by one from the bottom to the top. Additive manufacturing is rapidly gaining popularity in a variety of markets including automotive, aerospace, medical devices, pharmaceuticals, and industrial tooling.

The growth of additive manufacturing processes has led to various iterations of such processes being commercialized, including extrusion processes, such as fused deposition modeling (FDM), light polymerization processes, such as stereolithography (SLA) and multijet/polyjet, powder bed fusion processes, such as selective laser sintering (SLS) or binder jetting, and lamination processes, such as laminated object manufacturing (LOM). Nevertheless, despite this growth and rapid progress, additive manufacturing has limitations, such as the materials that can be used in conjunction with such processes. There are limited types of materials, and the performance of the materials limit the efficiency and quality that results.

Inkjet 3D printing is a method of additive manufacturing where printheads deposit droplets of liquid ink. Printheads are typically mounted on a gantry system to allow deposition of ink at different locations of the build platform. The build platform may also move with respect to the printheads, which may be stationary. The liquid ink may be solidified using UV or visible-light radiation.

Multiple printheads may be used in one system in order to build objects with multiple base materials. For example, materials that have different optical, mechanical, thermal, electromagnetic properties can be used. These materials can be combined to achieve composite materials with a wide range of material properties.

The UV curing unit is typically one of the subsystems used within an inkjet additive manufacturing apparatus. UV radiation provides the means of solidifying inks via photo-initiation of the polymerization reaction. UV radiation can be supplied by a variety of different mechanisms such as arrays of LEDs and Mercury or Xenon arc lamps. UV curing is typically applied after each printed layer or after depositing each material within a layer. The UV curing unit can be fixed with respect to the printer or it can move independently with respect to the object.

Alternatively, ink solidification can be achieved by changes in thermal conditions. For example, a liquid material solidifies as its temperature is lowered. A variety of different inks can be used in this category such as waxes. Both uv-phase change and thermal-phase change inks can be combined to manufacture an object.

Because of the slight variation of each drop and surface tension of inks, liquid layers deposited onto the platform are not perfectly flat, requiring a mechanical flattening device in order to eliminate the error and error accumulation caused by uneven layers. The flattening device may be a roller, script, or even mill, etc. Typically, about 25-35% of jetted material is removed during the flattening process, resulting in significant waste and increased material cost.

3D printed objects when manufactured using an inkjet process may need structural support. For example, most objects with overhangs need support structures. Typically additional print data are generated for these support structures. In inkjet additive manufacturing, typically a separate ink is designated as a support material. This ink is also deposited using printheads and solidifies. It is desirable for the support material to be easily removed after the print is completed. There are many potential support materials including UV-curable materials that are soluble in water or other solvents or wax based materials that can be removed by melting.

In many cases inks may include additives. These additives include colorants in the form of dyes or pigments or the mixture of pigments and dyes that are dispersed or dissolved in the ink. Surfactants may also be used to adjust the surface tension of the ink for improved jetting or printing performance. In addition, other types of particles or additives may be used in order to enhance the mechanical, thermal or optical characteristics of the cured resin.

As an alternative to using mechanical flattening devices, it is possible to use a feedback loop based on machine vision. In general, the system uses a sensing device that images the build platform and printed objects. The sensing device can be an active or passive machine vision system. The imaging system measures spatial dimensions, 3D surface, 3D volume, or materials of the object being printed. Based on the data from these measurements the print data for the subsequent layers is adapted/modified.

There are many possibilities for the sensing component of the system. The sensing can be provided by a camera that captures spectral images of the object. It can be accomplished using a 3D scanner that measures surface of the object e.g., structured light 3D scanning or triangulation-based 3D scanning. The sensing can also be accomplished using a scanning system that provides volumetric data, e.g., optical coherence tomography (OCT), micro-CT, etc. These systems provide density or reflectivity of each location in the volume.

There are also many possibilities for implementing a feedback loop. In the simplest scenario, after each layer is printed the system scans the object's surface and generates print data to fill the appropriate material in the areas that should have the material but do not have it. The system also keeps track of where too much material has been deposited. In this case the material is not printed in the subsequent layer(s). In another scenario, the sensing is not performed after each layer but every n layers (e.g., n=2-10). After each sensing, additional layers might be inserted to planarize the surface. Similarly, the system keeps track of locations where too much material is deposited and modifies the data for the subsequent layers to account for these discrepancies from the original model. In another instance, after the system performs each sensing, it extracts the surface of the object. Based on this surface, the data for the next layers is computed. In this case, the surface is not necessarily planar, the next layers can be, for example, computed by offsetting the surface and slicing the digital model with this offset surface. Exposition of how such processes can be carried out are described in US Pat. Pub. 2018/0169953A1, titled "Additive Material Deposition for Additive Manufacturing, and in U.S. Pat. No. 10,252,466, titled "Systems and Methods of Machine Vision Assisted Additive Fabrication," which are incorporated herein by reference.

Optical coherence tomography (OCT) has been demonstrated as a way to measure the height of parts as they are made in an additive manufacturing system where the height information is used as feedback to improve part quality, for example, as described in Sitthi-Amorn, et al. "MultiFab: a machine vision assisted platform for multi-material 3D printing." *ACM Trans. Graph.* 34, 4, Article 129 (July 2015), which is incorporated herein by reference.

OCT is well suited for scanning parts made by additive manufacturing. In particular it can be used to measure the height of parts at a resolution of less than 10 microns for a wide range of materials. It can be used to scan: a range of materials from fully opaque to semi-transparent to fully transparent at visible wavelengths; a range of surface properties from highly scattering to strongly specularly reflective; both dielectrics and metals. OCT can also provide volumetric measurements of internal structures within a part, limited by the penetration of light into the volume. When using OCT to scan a part as it is being printed, the speed of printing may be limited by the rate at which a part can be scanned, leading to a need for fast OCT systems.

A system using a swept source laser with A-scan rates of 20 MHz and sensitivity of 98 dB has been described in Wieser et al., "Multi-megahertz OCT: High quality 3D imaging at 20 million A-scans and 4.5 GVoxels per second." *Optics express* 18, no. 14 (2010): 14685-14704. This rate is obtained with a relatively complex system that spatially multiplexes four separate scan spots and utilizes a custom laser. Faster scan rates with useful sensitivity and a single scanning spot may be achievable by using time stretch OCT (TSOCT), for example as described in Huo et al., "Ultra-high-speed optical coherence tomography utilizing all-optical 40 MHz swept-source," *Journal of biomedical optics* 20, no. 3 (2015): 030503, where the output of a pulsed broadband laser is stretched in time using an optical element with large group velocity dispersion (GVD) such as a long stretch of optical fiber or a chirped fiber Bragg grating.

The speed of a TSOCT system is limited by the rate of available lasers, up to 100 MHz in contrast to the fastest swept source lasers which operate up to ~5 MHz.

There is a need to perform high-speed metrology, for example, at speeds commensurate with printing speed in a three-dimensional printing system.

SUMMARY

In one aspect, in general, a method is directed to characterizing a continuously moving 3D object via interferometry-based scanning. In general, the 3D object is continuously moving relative to a scanner. In some examples, the 3D object is in continuous motion and the scanner is stationary. In other examples, the 3D object is stationary, and the scanner is in continuous motion. The method includes repeatedly forming several depth characterizations of the 3D object along respective scan lines of a plurality of scan lines on the surface of the 3D object. During the scanning, the 3D object undergoes continuous motion. The method further includes combining the determined depth characterization along the scan lines of the plurality of scan lines to form a depth map representing at least a depth of a portion associated with a location on the surface of the 3D object in the third direction on a grid of locations arranged in the first and second directions. Forming the depth characterizations includes scanning a frequency dispersed pulsed optical signal in a first direction across the continuously moving 3D object, the 3D object moving in a second direction substantially orthogonal to the first direction. The scanned optical signal forms scan lines on a surface of the 3D object in a third direction substantially orthogonal to the first direction and the second direction.

Aspects can include one or more of the following features:

The method may further include reflecting the pulsed optical signal off a rotating multifaceted mirror, then proceeding to pass the pulsed optical signal through a lens after the pulsed optical signal has been reflected off the rotating multifaceted mirror.

The method may further include concurrently scanning the signal forming multiple scan lines on the object. Each scan line may have a scan line offset in the first direction from the other scan lines. Scanning the signal forming multiple scan lines may include splitting said signal into multiple signals, and scanning each of the multiple signals across the 3D object by reflecting it off a moving mirror surface. Each scan line may have a corresponding moving mirror surface off of which to be reflected. Scanning the signal forming multiple scan lines may include passing each of the multiple signals through a corresponding lens of multiple lenses disposed in the first direction. At least some lens of the multiple lenses may be offset in the second direction from another of the lenses. The method may further include scanning the pulsed signal including passing the signal through a cylindrical lens with an axis extending substantially in the first direction.

The method may include interpolating the depth characterizations along the scan lines to points on the grid of locations. One or more synchronization signals may be monitored and interpolation may be performed according to said synchronization signals. Monitoring one or more synchronization signals may include monitoring a synchronization signal associated with at least one of a trigger signal from an optical source, a moving mirror surface, transport of the object in the second direction, and a time offset corresponding to an interval of time between a detection of a physical calibration marker and a start time of a first scan line of the plurality of scan lines.

The method may be configured to characterize a plurality of continuously moving 3D objects.

The method may include calibrating the scanning. The calibrating may include the following steps: first, the method obtains a set of samples for each scan line of the plurality of scan lines. Next, a sweep-start time is determined. The sweep-start time characterizes a relative beginning time of a first scan line of the plurality of scan lines from which a calibration time offset can be computed. This is followed by gathering a set of scan line data. The scan line data may relate to the scan lines represented in the set of samples for each scan line of the plurality of scan lines. Next, the calibration process may partition the set of scan line data into chunks, the chunks corresponding to individual scan lines across the third direction. Next, an offset in the second direction may be calculated using the time delay between samples for each scan line of the plurality of scan lines. Next, the data may be reconstructed on a grid using linear interpolation methods. The grid may be representative of the second direction and the third direction. The steps may be repeated as the 3D object moves to form a plurality of depth characterizations of the 3D object along respective scan lines of a plurality of scan lines on the surface of the object by scanning a frequency dispersed optical signal.

The method may further include additively fabricating the 3D object during the repeated scanning. Additively fabricating the 3D object may also include using the depth map in a feedback process.

In another aspect, in general, an apparatus is used for characterizing a continuously moving 3D object via interferometry-based scanning. The apparatus includes a scanner configured to generate a plurality of scan lines from the moving 3D object. The scanner includes an optical source configured to generate a frequency dispersed pulsed optical signal, and a rotating polygon mirror. The rotating polygon mirror is configured to direct the frequency dispersed pulsed optical signal in a first direction across a surface of the continuously moving 3D object. The 3D object moves in a second direction substantially orthogonal to the first direction, and the scanned frequency dispersed pulsed optical signal forms the plurality of scan lines on the surface of the 3D object. The rotating polygon mirror is further configured to direct a reflection of the frequency dispersed pulsed optical signal from the surface of the 3D object to an optical signal processor. The apparatus further includes an optical signal processor configured to process the reflection of the pulsed optical signal from the 3D object for each scan line of the plurality of scan lines. A depth characterization of the 3D object in a third direction along the scan line on the 3D object is determined based on this processing of the reflection. The third direction is substantially orthogonal to the first direction and the second direction. The optical signal processor is further configured to combine the determined depth characterizations along the scan lines of the plurality of scan lines to form a depth map representing at least a depth of a portion associated with a location on the surface of the 3D object in the third direction on a grid of locations arranged in the first and second directions.

The apparatus may include a lens disposed between the object and the mirror such that the frequency pulsed optical signal passes through the lens. The lens may be a cylindrical lens with an axis extending substantially in the first direction. The apparatus may include an optical splitter configured to split the frequency pulsed optical signal into several frequency pulsed optical signals. Several rotating polygon mirrors may also be included. Each of the rotating polygon mirrors may be configured to direct one corresponding frequency pulsed optical signal in a first direction across a corresponding part of the surface of the continuously moving 3D object. A number of lenses may be disposed between corresponding rotating polygon mirrors and a corresponding part of the surface of the continuously moving 3D object.

The apparatus may further include a fiber-coupled pulsed laser configured to generate a pulsed optical signal, and a dispersal component configured to receive a pulsed optical signal and to transform the pulsed optical signal into a time-stretched optical signal. The apparatus may further include an optical processing portion configured to generate an interference signal representing the depth characterization of the 3D object. The apparatus may also include a digital processing portion configured to receive the interference signal and to process the interference signal to generate the depth map.

The apparatus may further use an interpolation operation to generate a mapping of the depth characterizations along the scan lines to points on the grid of locations when combining the determined depth characterizations. The apparatus may further be configured to scan a plurality of continuously moving 3D objects.

An additional advantage of one or more embodiments is that they can incorporate one of many different types of standard pulsed lasers rather than requiring a customized swept source laser. This gives flexibility in choosing wavelength range, repetition rate and depth resolution (as a function of spectral bandwidth). For a fixed sampling rate the depth range can be controlled by the properties of the dispersion element.

Typical OCT systems use galvanometer mirrors to scan a part in two axes but these mirrors do not operate fast enough to keep up with a moving part in a 3D printer. An advantage of using a rotating polygon mirrors is that it can sweep a beam faster than a galvo mirror but only scan in one dimension. A polygon mirror can be used when the part being measured is moving in one axis such that the scan beam only needs to sweep across the dimension orthogonal to the motion axis.

Scanning of 3D printed parts may require less resolution and depth range than is required for medical (e.g., tissue sensing) applications. Therefore, OCT systems designed for such medical applications may not be well-matched to the requirements of additive manufacturing. Using typically commercially available lasers and rotating polygon mirrors, a cost-effective system can be built which can scan a part moving at 0.5 m/s at a resolution of 50 microns. A typical spectrum from a mode-locked fiber laser scan provides depth resolution of 25 microns or less and a depth range of at least 500 microns can be obtained using readily available analog to digital converters.

Other features and advantages of the invention are apparent from the following description, and from the claims.

DESCRIPTION

1. System Overview

Figure 1:
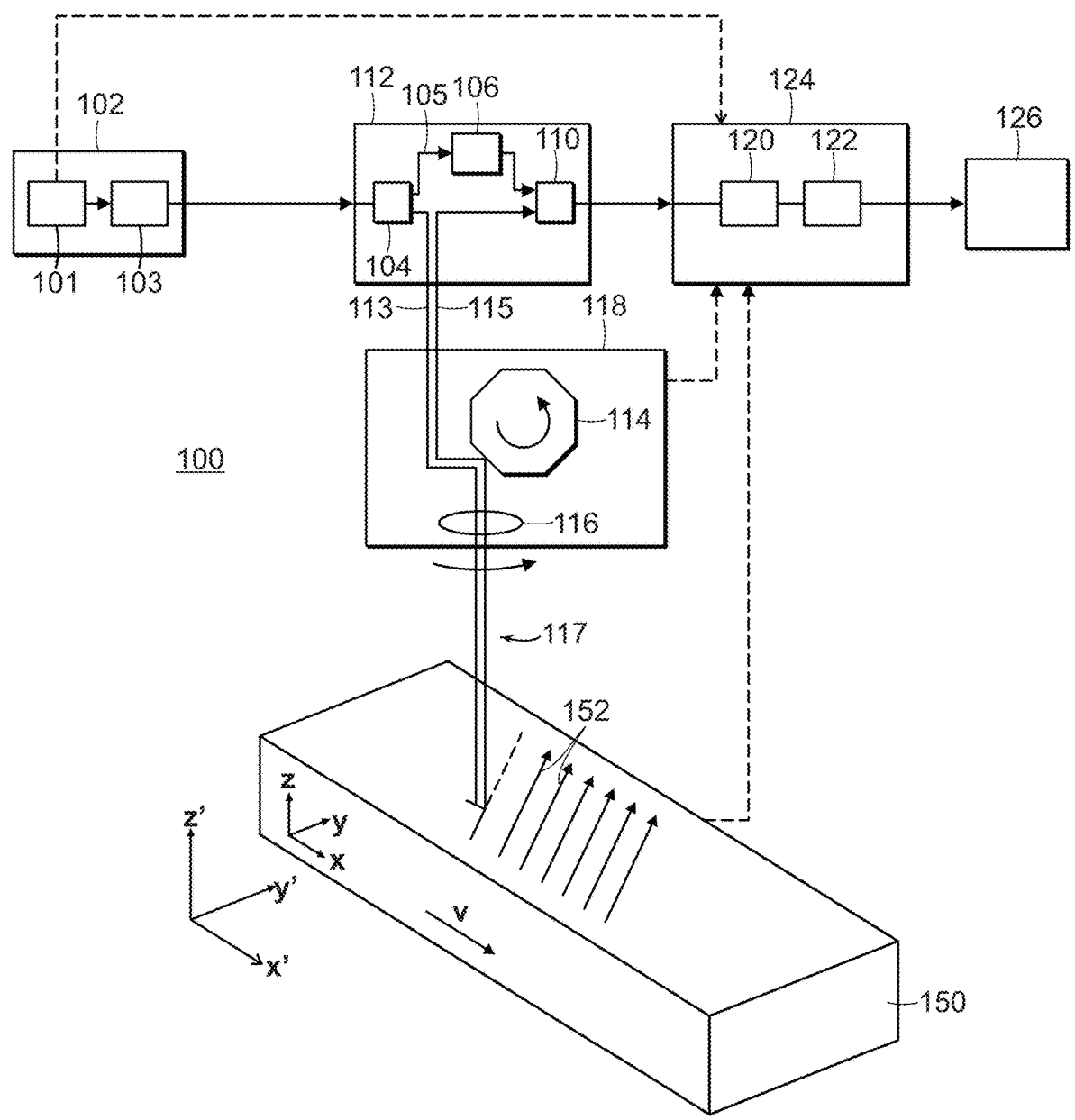
FIG. 1 is a block diagram of a scanning system.

Referring to FIG. 1, a scanning system 100 is used to characterize a moving object 150 by scanning it as it moves continuously without requiring the object to stop while it is being scanned. For example, the object 150 is a partially fabricated object that is moved back and forth under a fixed printhead (not shown) that deposits material on the object under a feedback control based on the result of the scanning. In particular, the characterization of the object 150 produced by the system 100 includes surface information, such as a "depth map" 126 for the object (e.g., a function z (x,y) where z is the thickness or depth and (x,y) is a coordination of the object in the object's (i.e., the build platform) frame of reference.

In the example shown in FIG. 1, the apparatus includes a scanner 118, which is configured to receive a sample optical signal 113, and to direct the signal to the object along a series of scan lines 152 on the moving object. The scanner 118 receives a reflection (or other optical emission from the object resulting from the sample optical signal impinging on the object), and passes is from the scanner as a sensed optical signal 115 (both the sample signal traveling to the object from the scanner and the resulting sensed signal emitted from the object are illustrated as a signal 117 in the figure). The scanner 118 includes a rotating polygon mirror 114 and a lens 116, which are used together to redirect and scan the optical signal 117 across the object along the scan lines 152. That is, the mirror directs the sample optical signal in a first direction (y' in the fixed y'-z' plane) across a surface of the continuously moving 3D object 150, while the object is moving in a second direction (x') substantially orthogonal to the first direction of the (x', y', z') fixed frame of reference.

The sample optical signal 113 is formed using an optical source 102. The source includes a broadband laser 101, which emits optical pulses and a dispersal element 103, which processes the pulses emitted from the laser 101 such that different wavelengths are delayed by different amounts of time yielding frequency-dispersed time-stretched optical pulses.

The system includes an interferometry subsystem 112, which receives the frequency dispersed optical pulses from the optical source 102, and splits that signal into the sample optical signal 113, which is passed to the scanner 118, and a reference optical signal 105, which is delayed by a delay component 106, and combined with the received sensed signal 115 from the scanner to form an output signal 116 from the interferometry subsystem 112. This signal is passed to a signal processor 124

The signal processor 124 processes the optical signal 116 formed by the interferometry subsystem for each of the scan lines 152 to determine a depth characterization of the object 150 along each scan line. The optical processor also combines the determined depth characterizations along multiple scan lines to form the depth map 126 representing at least a surface height z on an area across x-y plane of the object, for example on a regular grid of locations arranged in the x and y directions. Not shown in the figure is the use of the depth map 126 in the feedback control of the printing process, for example, for controlling the deposition of material in subsequent passes of the object under fixed printheads.

Continuing to refer to FIG. 1, the object 150 is illustrated as moving with a velocity v in the positive x' direction. If one scan along a scan line takes τ time, then the object will have been displaced by v×τ during the scan time. Therefore, although the scanning is along the fixed y' direction (i.e., the beam 117 is scanned in the y'-z' plane) the object is sensed at locations with slightly varying x locations, exaggerated for illustration in FIG. 1.

The signal processor 124 receives an indication of when each pulse is emitted from the optical source 102, an indication of when each scan caused by free-running rotation of the hexagonal mirror 114 begins to cross the object, and an indication of the x location of the object during its motion (or equivalently an indication of the start of its motion and the velocity, from which the x location may be derived). From this information, as described in more detail below, at any time during a scan, the optical signal processor 124 has sufficient information to determine the wavelength of the sample signal 113 (which is based on a time offset from the start of the pulse), from which is can determine the distance from the scanner to the point on the surface of the object from which the scanned emission occurs, and from that, the (x,y,z) coordinates of that point in the fixed frame of reference of the moving object.

The signal processor 124 in this embodiment has two parts: a depth characterizer 120 and a depth mapper 122. The depth characterizer 120 serves to produce a depth characterization along a single scan line of the 3D object after receiving the reflected optical signal associated with that scan line. The depth mapper 122 serves to produce a depth map characterizing the entire scanned surface of the 3D object after receiving a set of depth characterizations, where each scan line has an associated depth characterization in the set of depth characterizations. The depth mapper, after receiving all depth characterizations for the scan lines associated with the 3D object, analyzes them with respect to the motion information to create a depth map characterizing the surface of the 3D object.

2 Optical Source

As introduced above with reference to FIG. 1, the optical source 102 is configured to generate frequency-dispersed time-stretched optical pulses. In this embodiment, light from a fiber-coupled pulsed broadband laser 101 is directed to an optical component 103 with high group velocity dispersion such that wavelengths in the original pulse are mapped to time in a temporally broadened pulse. A variety of fiber-coupled pulsed lasers with a pulse length on the femto or picosecond time scale can be used as long as its bandwidth is wide enough to give the desired depth resolution and noise is sufficiently low. Examples of such choices are a Ti-Sapphire laser, a mode-locked fiber laser, a pulsed diode laser or a pulsed supercontinuum laser.

In some embodiments, the optical component 103 includes an optical circulator that directs the laser pulse to a chirped fiber Bragg grating with a linear dispersion D in typical units of ps/nm. The time stretched pulse reflected from the grating is directed by the circulator into a fiber interferometer that is part of the interferometry subsystem 112 as described below. In an alternative embodiment, the optical component 103 may be implemented by transmitting the broadband laser pulse through a single mode fiber of sufficient length L in km with $D=D_c(\lambda)L$ where the group velocity dispersion coefficient $D_c$ has typical units of ps/nm*km.

Figure 2:
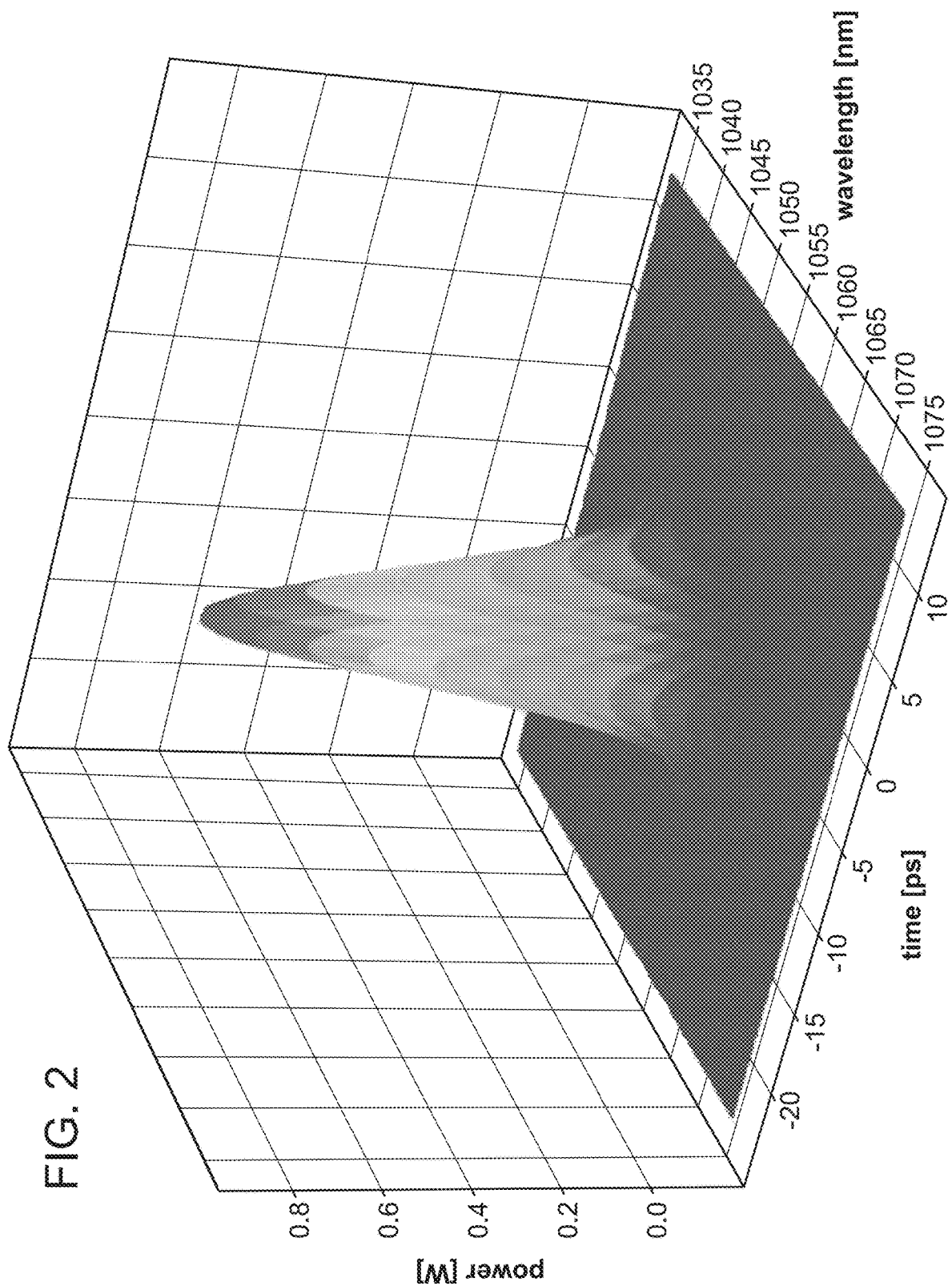
FIG. 2. is a plot of spectral energy of an optical pulse.
Figure 3:
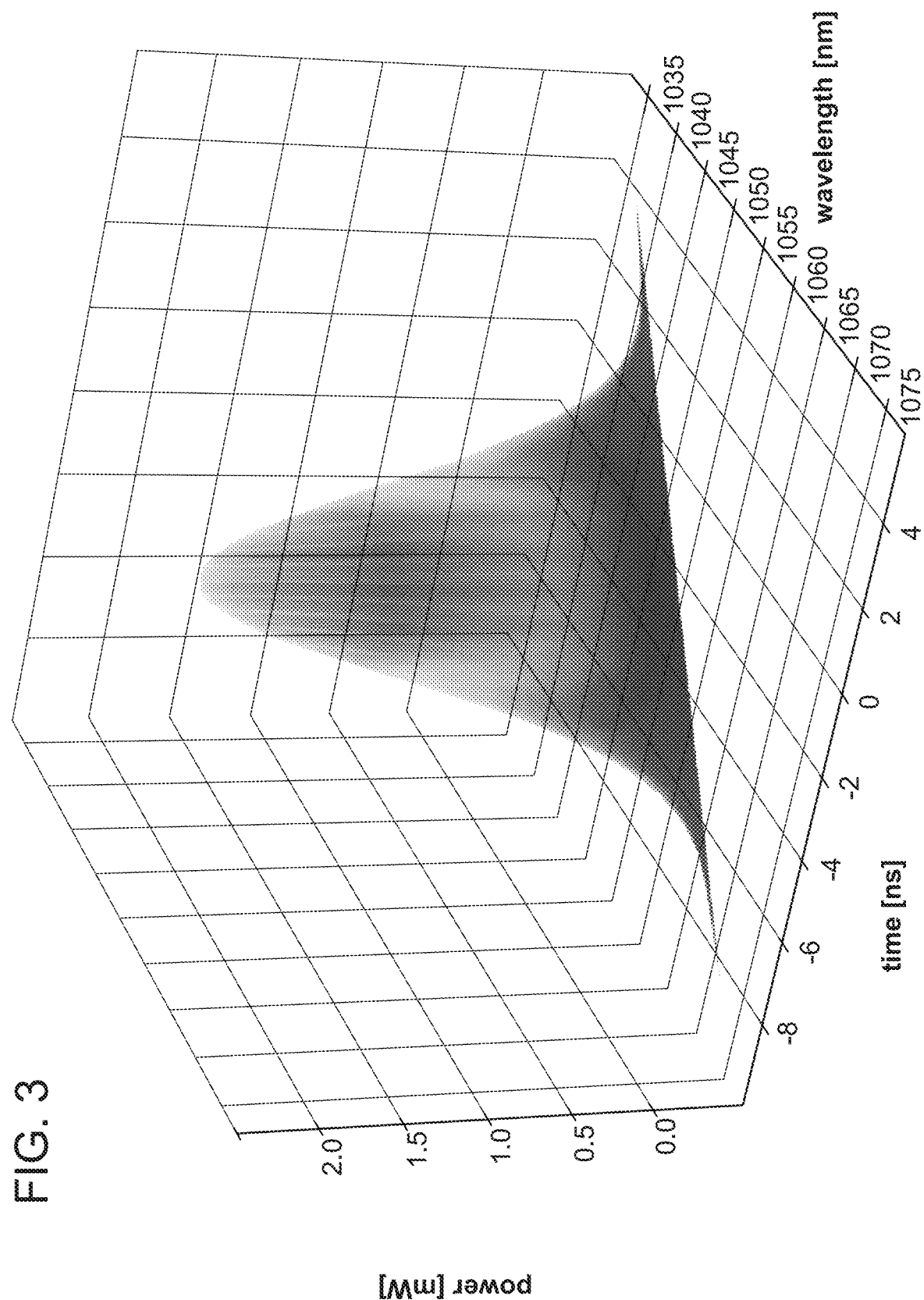
FIG. 3 is a plot of spectral energy of the optical pulse of FIG. 2 after frequency dispersal.

FIG. 2 shows a typical laser pulse with power as a function of time and wavelength. FIG. 3 shows the same laser pulse after time stretching.

Each laser pulse is stretched to a period which is shorter than the time between laser pulses. Therefore, for each laser pulse there is a period of time while an interference signal is generated at the output of the interferometry subsystem 112 and a period of time while there is no useful data. As discussed below the signal processor 124 selects the useful parts of the signal based on synchronization information provided to it by the optical source. In this embodiment, a synchronization signal is emitted from the pulsed laser, and in particular, an electronic pulse is emitted synchronously with the laser signal and passed to the signal processor 124.

The time-stretched pulse may be optically amplified in the optical source 102 and/or after first entering the interferometry subsystem 112 if the dispersive component 103 causes significant attenuation such that the signal to noise at the detector is not high enough to make accurate measurements. For example, a Ytterbium-doped fiber amplifier may be used.

After stretching, the wavenumber ($2\pi/\lambda$) as function of time is given by $$k(t)=2\pi\lambda_0-2\pi(t-t_0)/D\lambda^2$$

where $\lambda_0$ is the center wavelength of the pulse and $t_0$ is its time position in the stretched pulse.

Figure 4:
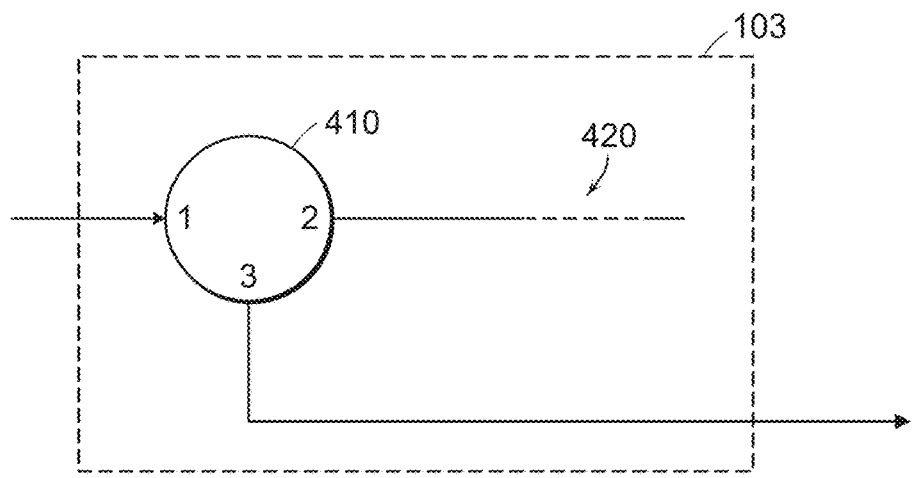
FIG. 4 is a diagram of an optical source.

Referring to FIG. 4, the dispersive component 103 may be implemented using a non-reciprocating, one-directional, three port device 410, with the input from the laser source 101 entering a first port and the frequency-dispersed pulse exiting a third port. The second port is coupled to a chirped fiber Bragg grating 420, which spreads out the pulses as a function of wavelength.

3 Interferometry Subsystem

Referring again to FIG. 1, the optical signal produced by the optical source 102 is received as input for the interferometry subsystem 112. As introduced above, in operation, it is the function of the interferometry subsystem 112 to split the optical signal into two separate beams, then create an interference signal using those two beams after they have been passed through subsequent subsystems. Specifically, the interferometry subsystem 112 receives an optical signal in its optical fiber interferometer 104, which serves as a splitter component splitting the optical signal into a sample optical signal 113 to be received by the scanner 118 and a reference signal 105, which is combined with sensed signal 115 from the scanner. The sample signal 113 and reference signal 115 are split with a 90:10 power ratio to account for attenuation in scanning the objet.

More specifically, at the interferometry subsystem 112 each time-stretched pulse output from the optical source 102 is directed into a fiber interferometer 104 that splits light into reference and sample signals passing via a reference arm and a sample arm, respectively. The reference arm includes a variable delay component 106 and an optional variable attenuator (not illustrated in FIG. 1). As described further below, the light of the sample arm is directed via the rotating mirror 114 from the sample arm fiber to a lens 116 that focuses the light onto the object 150 at the point to be measured. Light is specularly reflected and/or scattered by the object back through the lens 116 to the mirror 114 and is coupled back into the sample arm fiber. The light from the sample and reference arms is recombined in the interferometer. If the optical path difference between the reference and sample arms is shorter than the coherence length of the laser, then an interference signal will be generated and emitted from the interferometry subsystem.

4 Scanner

Further referring to FIG. 1, the scanner 118 receives the sample optical signal 113 from the interferometry subsystem 112 and uses it to scan the surface of the moving 3D object 150, then provides sensed signal 115 back to the interferometry subsystem 112. The scanner consists of two main parts: a rotating polygon mirror 114, and a lens 116. In operation, upon receiving the sample optical signal, the scanner reflects the signal off the rotating polygon mirror 114.

Figure 5:
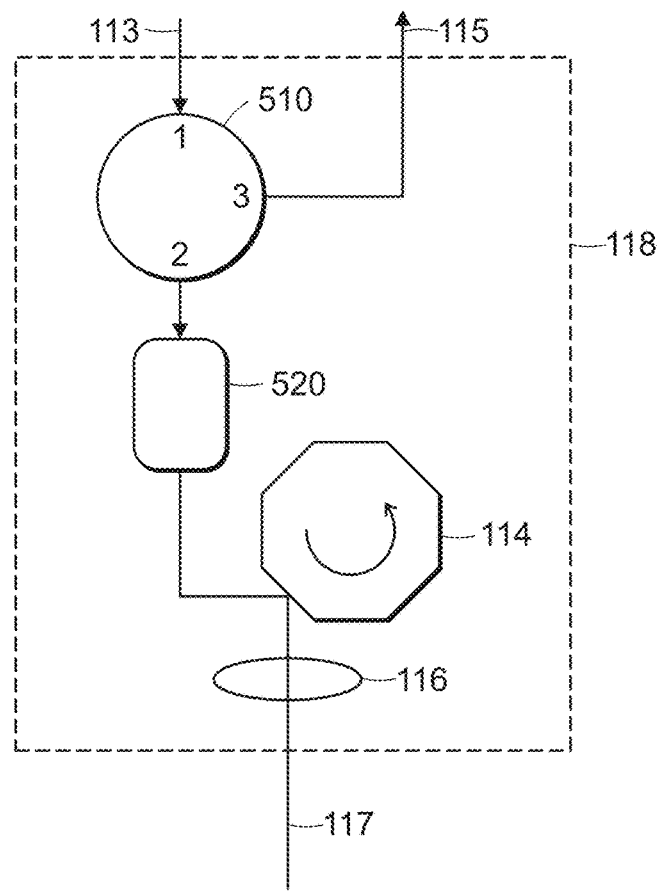
FIG. 5 is a block diagram of a scanner.

Referring to FIG. 5, the scanner 118 includes a circulator 510, a collimator 520, and the rotating mirror 114 and lens 116, previously introduced. As shown in FIG. 5, the sample signal 113 and the sensed signal 115 travel in opposite directions on light path from the circulator 510 to the sample, and back to the circulator 520. The sample signal 113 enters port 1 of the circulator 520, and the sensed signal 115 exits port 3 of the circulator. The collimator 520 causes the sample signal 113 to become more aligned in the direction of the mirror (i.e., make collimated light or parallel rays) and/or to cause the spatial cross section of the beam to become smaller.

The collimated light reflects off the rotating polygon mirror 114 and is swept across the back of a telecentric scan lens 116 such that a focused laser spot repeatedly and unidirectionally moves along a scan line 152 (as shown in FIG. 1) oriented substantially orthogonal to the direction of motion of the object. The same face of the mirror reflects the sample signal toward the object and the sensed signal from the object, and both signals pass through the collimator 520.

Figure 6:
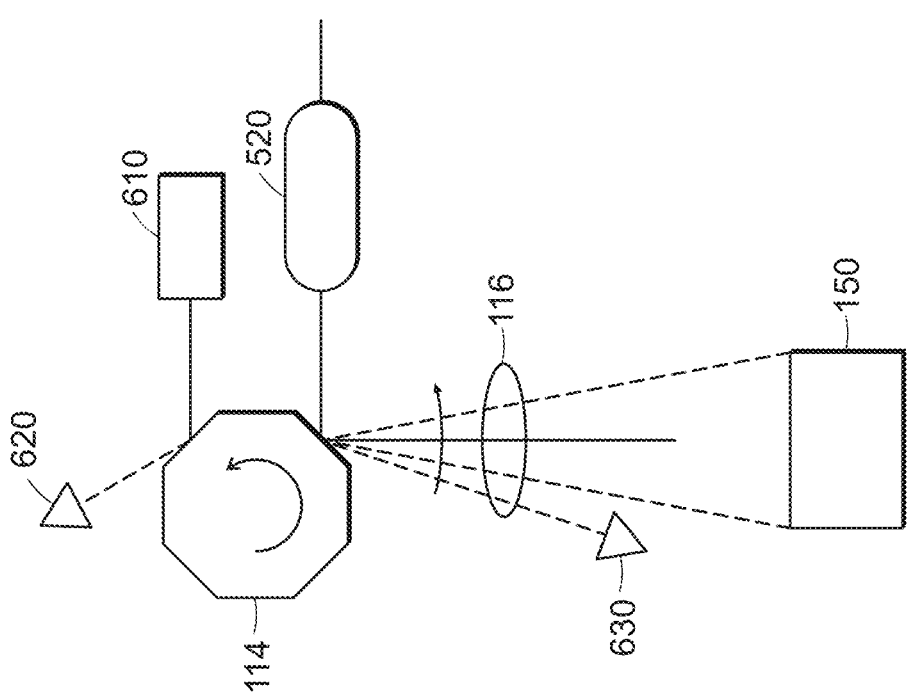
FIG. 6 is an illustration of two approaches for generating alignment data.

In this embodiment, the rotating polygon mirror 114 rotates in an open loop manner (i.e., without feedback positional control) such that there is no ability required to control where the reflected laser spot is located at any point in time. If a polygon mirror rotates without any feedback as to its position, then there is not enough information to know the location of the scanner laser spot on the sample relative to the angular position of the active mirror facet. However, the scan line data from each facet of the mirror must be aligned relative to each other in the signal processor 124 to generate the depth map 126 for the object 150. Two alternative ways to generate this alignment data may be used, both of which are illustrated together in FIG. 6

In each of two alternative embodiments, a start of scan sensor 620 or 630, respectively, is used to generate a regular electronic pulse once per mirror facet passing at a regular time interval. In a first embodiment, the start of a scan signal is generated by a second laser 610 that reflects off a polygon facet that is a fixed number of facets from the facet currently directing the scan laser to the part being measured, in FIG. 6 two facets away. The second laser beam is directed to a light detector 620 once per facet passing whenever a facet is oriented at the correct angle to reflect the beam toward the detector. In another embodiment, if a portion of a scan lens 116 does not overlap with the object being scanned then a detector 630 can be placed underneath the scan lens at a location that will not occlude the scan laser from reaching the object. This allows a start-of-scan signal to be generated by the sample signal 113 itself.

Successive scan lines 152 shown in FIG. 1 result from reflections of successive faces of the polygonal mirror 114. That is, if there are N faces, then every $N^{th}$ scan line is from the same face of the mirror. In the ideal case where the full field of the lens exactly matches the full width of the part and the mirror has no dead zones between facets, each facet of the polygon sweeps the beam in the same direction across the entire part in the y' direction. For a mirror with N facets and speed s in revolutions per minutes, the single facet transit time is given by $\tau=60/Ns$ seconds. As discussed above, the object moves a distance $\Delta x=\tau v$ at velocity v during each such scan.

In a third alternative embodiment, an encoder on the mirror measures the angular position of the mirror. For a mirror with N facets the laser pulses once per scan line corresponding to a change in angle of 360/N degrees. As a calibration process, it is also necessary to compute the calibration time offset $\delta T$. This can be done manually (e.g., by viewing the resulting depth map 126 and selecting the appropriate shift in the y direction). Alternatively, it is possible to perform this by using a physical calibration marker, e.g., a depth change or strong reflectance change. For example, the calibration marker can be located at the beginning of the scan sweep on the platform. The signal from the calibration marker will be detected by processing the depth data. The number of laser pulses between the detection of the reference edge and the start of scan signal gives a temporal reference δT corresponding to the relative physical location of the scan laser at the time at which the start-of-scan signal is received. This allows the start-of-scan signal to be used to generate an absolute physical reference for the scan laser pulses. This procedure can be done once as a pre-calibration and can be manually tuned as necessary.

In order to sense the surface of the object in range of the scanning optics, one approach is to keep the relative height of the scanning optics of the scanner 118 above the scanned object constant as the height of the part increases during fabrication. Either the platform holding the object can move down away from the scanning optics as the object is fabricated and more material is deposited or the scanning optics can move up away from the part as its thickness increases.

Given that the object and scanner are moving in relationship to each other along the x axis, an additional synchronization signal is used by the signal processor 124 in order to correlate a given signal sample to a particular x position. In some embodiments, this signal is generated by a high-resolution encoder associated with the x axis, for example, on a moving build platform for the moving object being fabricated. Equivalently, in embodiments in which the object is stationary and the scanner moves, this encoder would represent the motion of the scanner.

For an object moving with velocity v and a sufficiently small spot, the scan resolution in the direction of motion is given by the distance between scan lines, $\Delta x = v \times \tau$. The distance between measured spots in the y direction is a function of the laser pulse repetition rate p per second, then the number of pulses and therefore spots across one scan line is $\tau p$, and the spacing of the spots is $\Delta y = Y/\tau p$, where Y is the length of the scan line in the y direction. Note that the temporal length of the stretched pulse must be less than the time between laser pulses, $1/p$.

Because the object moves past the scanner 118 in the x direction there is no limit imposed by the optics on the maximum length of a part in that dimension. However, the practical length of the scan lines 152 may be limited by the size of the lens 116. Arrangements with multiple scan beams, which may increase the width limit are described later in this description.

5 Signal Processor

As introduced above, the output of the interferometry subsystem 112 is a combination of a fixed delayed version of the reference signal, and variable delayed version of the sample signal, where the variable delay is a function of the travel path from the scanner to the object and back and any fixed delay in the optical components of the scanner 118. Very generally, if the component of the output corresponding to the reference signal is in phase with the component corresponding to the sensor signal then a detector at the input to the signal processing subsystem 124 will sense a high intensity, while if they are out of phase, the detector will sense a low intensity. Because the wavelength of the signals varies during each pulse, the intensity will vary during each pulse as well. This variation in intensity during each pulse is used by the signal processor 124 to determine the depth of each spot on each scan line on the object.

More precisely, the temporally modulated photocurrent from a detector corresponding to a single reflective sample height can be written as follows:

$$i(t) = \rho(t)(T_r P(t) + T_s(t) P(t) r^2 + 2(T_r(t) T_s(t))^{1/2} r \, P(t) \cos(2k(t)z + \varphi))$$

where:

ρ is the detector responsivity $T_r$ and $T_s$ are the absolute values of the optical power transmission of the reference arm and the sample arm between the input to the interferometer and the detector P is the power spectrum of the stretched laser pulse after optional optical amplification $re^{j\varphi}$ is the complex reflectance of the sample 2z is the round trip optical path difference between the reference and sample arms k is the wavenumber which varies in time as a function of the dispersion element The detector responsivity, spectral power, system transmission and sample reflectivity are all originally functions of wavelength but can be converted to functions of time through the relationship between wavenumber and time.

The signal from the detector is continuously streamed to an analog to digital converter (ADC). If the dispersion element is not linear with respect to wave number then the interference signal is renormalized to be linear with respect to wavenumber. The digitized interference signal is converted to depth information by taking the inverse discrete Fourier transform of the signal. A peak in the transform provides the depth information at the point. The synchronization signals received from the optical source 102, representing the start time of each pulse, from the scanner 118 representing the start of each scan line, and from the platform representing the x axis position of the object, are used to determine an (x,y,z) coordinate for each spot on a scan line. These locations are then interpolated onto a regular grid in the x-y plane, to form the output depth map 126.

6 Alternatives

A number of factors may limit the width (i.e., the y axis dimension) of the object being scanned. One limit may be the size of the lens 116. For example, because there is necessarily some physical distance between the rotating mirror and the lens, the lens must have sufficient usable width be able to scan the entire part. Another limit may be the maximum rate of pulsing, which limits the minimum separation of the spots that are sensed on the surface. One alternative is to use a cylindrical lens extending in the y' direction to extend the usable range.

Figure 7:
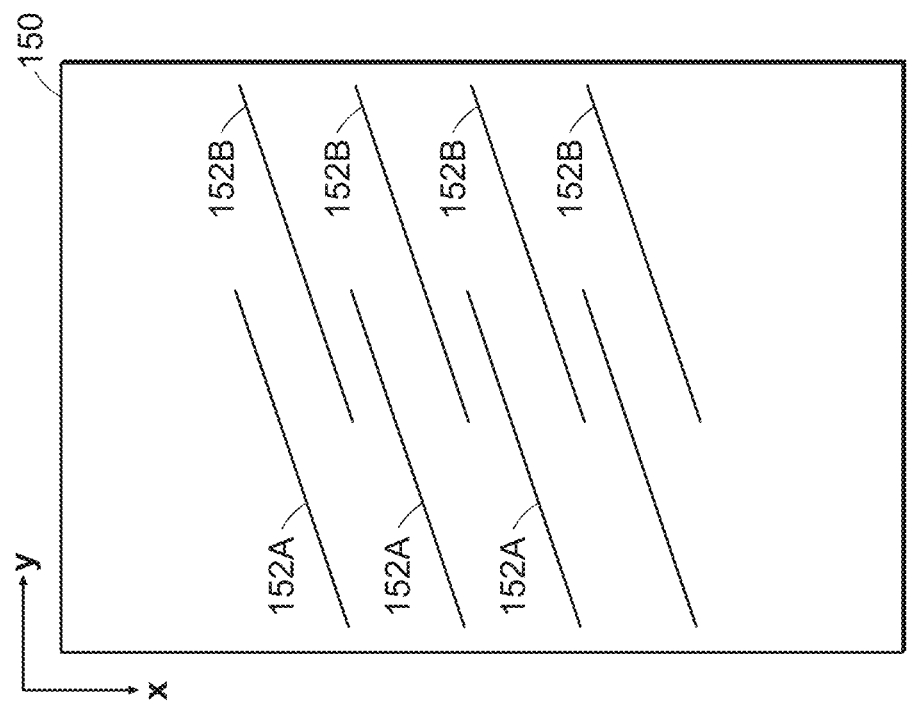
FIG. 7 is an illustration of scan lines for a multiple-scanner embodiment.
Figure 8:
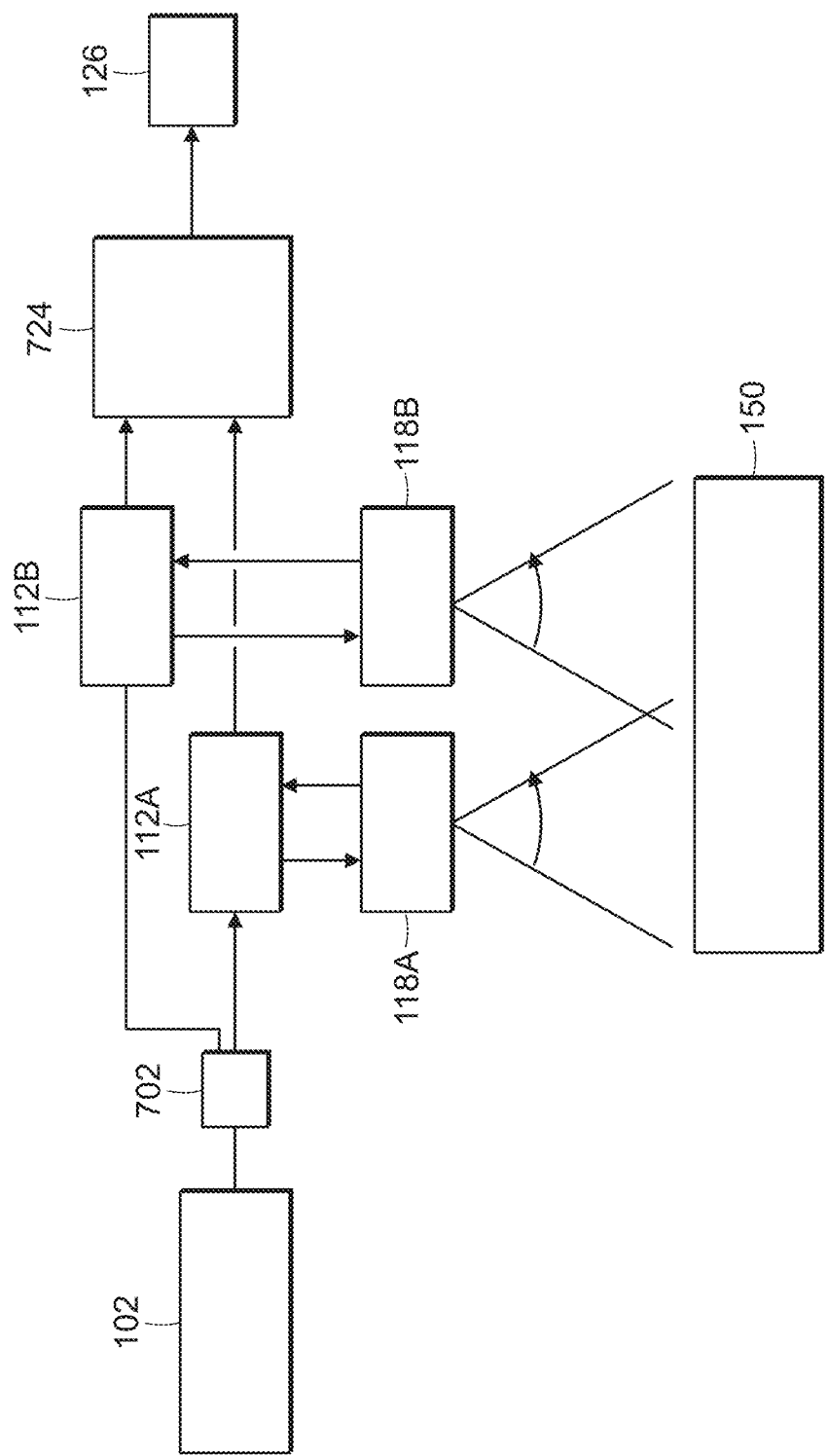
FIG. 8 is a block diagram of a multiple scanner embodiment.

As illustrated in FIG. 7, another general class of alternatives uses concurrent scanning on multiple scan lines across the object. In this figure, each scan line 152A is scanned concurrently with one scan line 152B, for example, with both scans being in the same y'-z' plane of the scanner frame of reference. Referring to FIG. 8, one approach to such concurrent scanning is to split the output of the optical source 102 in an equal splitter 702, and to pass that signal to a first interferometer subsystem 112A and corresponding scanner 118A, and to a second interferometer subsystem 112B and corresponding scanner 118B. The outputs of the two interferometer subsystems 112A and 112B are passed to a signal processor 724, which independently processes each of the signals as in the signal processor 124, but then prior to interpolation maps each set of spots onto a common grid. As illustrated in the figure, the scan lines 152A and 152B overlap in the x direction, which permits a signal processor to "stitch" together the depth maps (or volumetric scans) from the different scanner subsystems to form a consistent depth map across the entire object. Of course, more than two scanner subsystems may be used to increase the scannable width of the object.

The signal processor 724 takes into account synchronization signals from each of the scanner subsystems, whose mirrors are not necessarily synchronized, and therefore the start of each scan line 152A and 152B may not be synchronized. The signal processor 724 determines a registration of the two sets of scan lines, for example, using overlapped regions of the scanned object, or using a calibration phase before the fabrication of the object begins.

In the example above, each of the scanners 118A-B and their corresponding lens 116A-B are arranged in line along the fixed y' axis. Referring to FIG. 8, to increase the number of lenses that can fit along the y' the lenses may be offset in the x' direction such that lenses 116A and 116C are on the same x' point, and lens 116B is offset in the x' direction. The operation of the system is identical to the multiple scanner approach described above, with the signal processor 724 taking into account this x' offset when interpolating the depth information at spots on the scan lines to form the depth map on a regular grid.

In a similar manner to using multiple scanner subsystems 118 to increase scannable width, multiple scanner subsystems 118 can be used to extend the range in depth in the z direction, for example, with different lenses focusing at different depths, for example, mounting of lenses 116A-C at different offsets in the z direction, but having their scan range overlap fully in the y direction. The signal processor 724 then combines the signals from the different scanner subsystems, for example, according to the signal to noise ratio of the different interferometer output signals.

Although the discussion above focuses on computing a depth map of the object, other outputs may be derived. For example, density information as a function of three dimensions may be obtained by combining the information from scans in multiple passes of the object under the scanning system.

It should be understood that although described in the context of scanning during three-dimensional fabrication, the same scanning approach may be used for other tasks that require continuous monitoring. For example, manufactured items passing on a conveyor belt under the scanner can be sensed, for example, for quality-control applications.

Embodiments of the signal processor (e.g., 124, 724) may make use of hardware (digital and/or optical hardware) as well as software. The digital hardware may include application-specific integrated circuits (ASICs), field programmable gate arrays (FPGAs) and the like, to process the output of a digital-to-analog converter that processes the output of a photo-detector at the input of the signal processor (or pair of photodetectors configured in a differential input mode). The software can include instructions for causing a processor to implement data processing operations, for example, to implement the Fourier Transform calculation of the signal processor. Additionally, embodiments of the system may make use of a controller, which also may be implemented in hardware, software, or a combination of hardware and software, which coordinates operation of the light source, scanner subsystem, signal processor, and/or built platform in order to synchronize the operation of the subsystems to yield the depth map for the object in the object frame of reference.

It is to be understood that the description is intended to illustrate and not to limit the scope of the invention, which includes the scope of the appended claims. Other embodiments than those described above are within the scope of the following claims.

What is claimed is:

1. A method for characterizing a continuously moving 3D object via interferometry-based scanning, the method comprising:

repeatedly forming a plurality of depth characterizations of the 3D object along respective scan lines of a plurality of scan lines on the surface of the 3D object during continuous motion of the 3D object, the forming including:
scanning a frequency dispersed pulsed optical signal in a first direction across the continuously moving 3D object, said 3D object moving in a second direction substantially orthogonal to the first direction, the scanned optical signal forming scan lines on a surface of the 3D object, and
processing a reflection of the pulsed signal from the object to determine a depth characterization of the 3D object in a third direction along the scan line on the 3D object, wherein the third direction is substantially orthogonal to the first direction and the second direction; and combining the determined depth characterization along the scan lines of the plurality of scan lines to form a depth map representing at least a depth of a portion associated with a location on the surface of the 3D object in the third direction on a grid of locations arranged in the first and second directions.

2. The method of claim 1 wherein scanning the pulsed optical signal comprises reflecting the pulsed optical signal off a rotating multifaceted mirror.

3. The method of claim 2 wherein scanning the pulsed signal includes passing the pulsed optical signal through a lens after the pulsed optical signal has been reflected off the rotating multifaceted mirror.

4. The method of claim 1 wherein scanning the pulsed signal comprises concurrently scanning the signal forming multiple scan lines on the object, each scan line having a scan line offset in the first direction from the other scan lines.

5. The method of claim 4 wherein scanning the signal forming multiple scan lines comprises splitting said signal into multiple signals, and scanning each of the multiple signals across the 3D object by reflecting it off a moving mirror surface corresponding to a scan line of the multiple scan lines.

6. The method of claim 5 wherein scanning the signal forming multiple scan lines further comprises passing each of the multiple signals through a corresponding lens of multiple lenses disposed in the first direction.

7. The method of claim 6 wherein at least some lens of the multiple lenses is offset in the second direction from another of the lenses.

8. The method of claim 1 wherein scanning the pulsed signal comprises passing the signal through a cylindrical lens with an axis extending substantially in the first direction.

9. The method of claim 1 wherein combining the determined depth characterization along the scan lines includes interpolating the depth characterizations along the scan lines to points on the grid of locations.

10. The method of claim 9 wherein combining the determined depth characterization along the scan lines includes monitoring one or more synchronization signals and performing the interpolating according to said synchronization signals.

11. The method of claim 10 wherein monitoring one or more synchronization signals includes monitoring a synchronization signal associated with at least one of a trigger signal from an optical source, a moving mirror surface, transport of the object in the second direction, and a time offset corresponding to an interval of time between a detection of a physical calibration marker and a start time of a first scan line of the plurality of scan lines.

12. The method of claim 11 wherein the physical calibration marker is an edge of a build platform, wherein the continuously moving 3D object is disposed on the build platform.

13. The method of claim 1 wherein the method is further configured to characterize a plurality of continuously moving 3D objects.

14. The method of claim 1 wherein the forming a depth map representing at least a location of a surface of the 3D object in the third direction on a grid of locations arranged in the first and second directions includes calibrating the scanning, the calibrating comprising:
   obtaining a set of samples for each scan line of the plurality of scan lines;
   determining a sweep-start time characterizing a relative beginning time of a first scan line of the plurality of scan lines;
   gathering a set of scan line data, wherein the scan line data relates to the scan lines represented in the set of samples for each scan line of the plurality of scan lines;
   partitioning, based on the sweep-start time, the set of scan line data into chunks, the chunks corresponding to individual scan lines across the third direction;
   calculating an offset in the second direction, the calculating including using the time delay between samples for each scan line of the plurality of scan lines;
   reconstructing, using linear interpolation methods, the data on a grid representative of the second direction and the third direction; and
   repeated, during continuous motion of the 3D object, to form a plurality of depth characterizations of the 3D object along respective scan lines of a plurality of scan lines on the surface of the object by scanning a frequency dispersed optical signal.

15. The method of claim 1 further comprising additively fabricating the 3D object during the repeated scanning.

16. The method of claim 15 where additively fabricating the 3D object comprises using the depth map in a feedback process.

17. An apparatus for characterizing a continuously moving 3D object via interferometry-based scanning, the apparatus comprising:
   an optical source configured to generate a frequency dispersed pulsed optical signal;
   a scanner configured to generate a plurality of scan lines from the moving 3D object, the scanner comprising:
      a rotating polygon mirror configured to
         direct the frequency dispersed pulsed optical signal in a first direction across a surface of the continuously moving 3D object, said 3D object moving in a second direction substantially orthogonal to the first direction, the scanned frequency dispersed pulsed optical signal forming the plurality of scan lines on the surface of the 3D object, and
         direct a reflection of the frequency dispersed pulsed optical signal from the surface of the 3D object to a signal processor; and
   the optical signal processor configured to,
      for each scan line of the plurality of scan lines, process the reflection of the pulsed optical signal from the 3D object to determine a depth characterization of the 3D object in a third direction along the scan line on the 3D object, wherein the third direction is substantially orthogonal to the first direction and the second direction, and
      combine the determined depth characterizations along the scan lines of the plurality of scan lines to form a depth map representing at least a depth of a portion associated with a location on the surface of the 3D object in the third direction on a grid of locations arranged in the first and second directions.

18. The apparatus of claim 17 wherein the scanner further comprises a lens disposed between the object and the mirror such that the frequency pulsed optical signal passes through the lens.

19. The apparatus of claim 18 wherein the lens is a cylindrical lens with an axis extending substantially in the first direction.

20. The apparatus of claim 17 wherein the scanner further comprises an optical splitter configured to split the frequency pulsed optical signal into a plurality of frequency pulsed optical signals.

21. The apparatus of claim 20 wherein the scanner further comprises a plurality of rotating polygon mirrors, each rotating polygon mirror of the plurality of rotating polygon mirrors configured to direct a corresponding one of the plurality of frequency pulsed optical signals in a first direction across a corresponding part of the surface of the continuously moving 3D object.

22. The apparatus of claim 21 further comprising a plurality of lenses, each lens of the plurality of lenses disposed between a corresponding one of the plurality of rotating polygon mirrors and a corresponding part of the surface of the continuously moving 3D object.

23. The apparatus of claim 17 wherein the optical source further comprises:
   a fiber coupled pulsed laser configured to generate a pulsed optical signal; and
   a dispersal component configured to receive a pulsed optical signal and to transform the pulsed optical signal into a time stretched optical signal.

24. The apparatus of claim 17 wherein the optical signal processor further comprises:
   an optical processing portion configured to generate an interference signal representing the depth characterization of the 3D object; and
   a digital processing portion configured to receive the interference signal and to process the interference signal to generate the depth map.

25. The apparatus of claim 17 wherein the optical signal processor is configured to perform an interpolation operation to generate a mapping of the depth characterizations along the scan lines to points on the grid of locations when combining the determined depth characterizations.

26. The apparatus of claim 17 wherein the scanner is configured to scan a plurality of continuously moving 3D objects.

27. The method of claim 1, wherein repeatedly scanning the optical signal comprises repeatedly directing said signal in a fixed plane while the object moves in a substantially orthogonal direction said plane.

28. The apparatus of claim 17, wherein the scanner is configured to repeatedly direct the signal in a fixed plane while the object moves in a substantially orthogonal direction said plane.

29. A method for fabricating a 3D object comprising:
   fabricating a first part of the 3D object;
   characterizing the first part of the 3D object via interferometry-based scanning, including determining a depth characterization of the first part of the 3D object;

determining characteristics of a layer of the 3D object based on the depth characterization of the first part of the 3D object; and fabricating the layer of the 3D object on the first part of the 3D object according to the determined characteristics of the layer;

wherein the characterizing the first part of the 3D object comprises:

repeatedly forming a plurality of depth characterizations of the first part of the 3D object along respective scan lines of a plurality of scan lines on the surface of the first part of the 3D object during continuous motion of the first part of the 3D object, the forming including:

scanning a frequency dispersed pulsed optical signal in a first direction across the continuously moving first part of the 3D object, said first part of the 3D object moving in a second direction substantially orthogonal to the first direction, the scanned optical signal forming scan lines on a surface of the first part of the 3D object, and processing a reflection of the pulsed signal from the object to determine a depth characterization of the first part of the 3D object in a third direction along the scan line on the first part of the 3D object, wherein the third direction is substantially orthogonal to the first direction and the second direction; and combining the determined depth characterization along the scan lines of the plurality of scan lines to form a depth map representing at least a depth of a portion associated with a location on the surface of the first part of the 3D object in the third direction on a grid of locations arranged in the first and second directions.

30. The method of claim 29 wherein fabricating the layer of the 3D object on the first part of the 3D object comprises depositing material on the first part of the 3D object during continuous motion of the first part of the 3D object in a direction parallel to the second direction.

\* \* \* \* \*